United States Patent Office 3,099,672
Patented July 30, 1963

3,099,672
REDUCTION OF HALOGEN-CONTAINING
SILICON COMPOUNDS
Glenn D. Cooper and Alfred R. Gilbert, Schenectady, N.Y., assignors to General Electric Company, a corporation of New York
No Drawing. Filed Dec. 19, 1955, Ser. No. 553,744
11 Claims. (Cl. 260—448.2)

This invention relates to a method of reducing halogen and alkoxy containing silicon compounds. More particularly, this invention is concerned with the method of reducing a halogenosilane or an alkoxysilane which comprises effecting reaction at a temperature of from 175° to 350° C. between sodium hydride and a silicon compound containing from 1 to 4 silicon-bonded halogens or alkoxy radicals with any remaining valences of silicon in said silicon compound being satisfied by members selected from the class consisting of hydrogen and hydrocarbon radicals such as alkyl radicals, alkenyl radicals, aryl radicals and aralkyl radicals.

In the preparation of organosilicon compounds by conventional methods, it is common to pass organic halide vapors over elemental silicon or a silicon alloy to form organosilicon compounds containing both silicon-bonded halogen radicals and silicon-bonded organic radicals as well as compounds in which the four valences of silicon are satisfied by halogen atoms. These processes of forming organosilicon compounds are particularly applicable to the formation of silanes containing both methyl and halogen groups, and in the most used method of preparing organosilicon compounds, methyl chloride is passed over silicon in the presence of a catalyst at elevated temperatures to form mixtures of methylchlorosilanes. These methylchlorosilanes comprise methyltrichlorosilane, dimethyldichlorosilane, trimethylchlorosilane, as well as minor amounts of tetramethylsilane and silicon tetrachloride. Although these organosilicon compounds containing both organic and halogen atoms are very valuable in many applications, such as in the formation of the silicone oils, resins and elastomers, it is often desirable to obtain silicon compounds (silicon hydrides) containing hydrogen bonded directly to silicon through silicon-hydrogen linkages. By the conventional processes of forming silicon hydrides only a relatively small number of silicon-bonded hydrogen atoms are obtained. The term "silicon hydride" as used in the present application refers to compounds in which four hydrogens are bonded to silicon as well as compounds which contain one or more alkyl, halogen, alkoxy, alkenyl, aryl or aralkyl radical bonded to silicon in addition to the silicon-bonded hydrogen.

It is an object of the present invention to provide a method whereby organohalogenosilanes, organoalkoxysilanes and silicon tetrachloride may be converted to silicon hydrides in which at least a portion of the silicon-bonded chlorine atoms or alkoxy radicals are replaced by silicon-bonded hydrogen atoms.

This and other objects of our invention will best be understood by reference to the following description taken in connection with the appended claims.

The process of the present invention is based on our discovery that organohalogenosilanes, organoalkoxysilanes and silicon tetrachloride may be reduced to silicon hydrides by effecting reaction between the former compounds and sodium hydride at a temperature of from about 175° to 350° C. The discovery of our process is totally unexpected in view of the fact that previous workers in the organosilicon field have attempted to effect reaction between sodium hydride and organohalogenosilanes, organoalkoxysilanes or silicon tetrachloride and have observed no evidence whatsoever of any reaction.

Silicon compounds which contain at least one silicon-bonded halogen atom or alkoxy radicals with the remaining valences of silicon being satisfied by hydrogen and hydrocarbon radicals such as alkyl radicals, alkenyl radicals, aryl radicals, and aralkyl radicals will be referred to hereinafter for the sake of brevity as "reducible silicon compounds."

Among the reducible silicon compounds within the scope of the present invention may be mentioned those within the scope of the following formula (1)  $Si(X)_a(R)_{4-a}$ 

where X represents members selected from the class consisting of halogen and alkoxy radicals, e.g., methoxy, ethoxy, butoxy, etc. radicals; $a$ is an integer equal to from 1 to 4; and R represents members selected from the class consisting of hydrogen, alkyl radicals, e.g., methyl, ethyl, propyl, butyl, octyl, cyclohexyl, etc. radicals; alkenyl radicals, e.g., vinyl, allyl, etc. radicals; aryl radicals, e.g., phenyl, tolyl, naphthyl, ethylphenyl, etc. radicals; aralkyl radicals, e.g., benzyl, phenylethyl, etc. radicals.

By the process of the present invention silicon hydrides may be formed having the structure (2)  $Si(H)_b(X)_n(R)_{4-(b+n)}$ 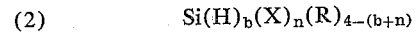

where R and X have the meanings previously described, $b$ is an integer equal to from 1 to 4, inclusive, $n$ is a whole number equal to from 0 to 3, inclusive, and the sum of $b+n$ is an integer equal to from 1 to 4, inclusive.

Although the reducible silicon compounds which are employed as starting materials in the method of the present invention are well known in the art, reference is made to "Chemistry of the Silicones" by E. G. Rochow, 2nd Edition, John Wiley & Sons, Inc. (1951), for information on the physical characteristics and method of preparation of many of these compounds. Among the specific reducible silicon compounds contemplated by the present invention may be mentioned, for example, methyltrichlorosilane, methyltriethoxysilane, dimethyldichlorosilane, dimethyldiethoxysilane methyldiethoxy, vinyltrichlorosilane, silicon tetrachloride, phenylmethyldichlorosilane, phenyltrichlorosilane, benzyltrichlorosilane, allyl methyldichlorosilane, methylcyclohexyldichlorosilane, etc.

The sodium hydride, NaH, which is employed in the practice of the present invention is a commercially available material and is generally obtained as a dry powder or as a suspension in a suitable liquid medium. For the purposes of the present invention, the sodium hydride may be employed in any of its commercial forms or in any other form as long as the sodium hydride is not mixed with any material which is reactive under the conditions of the reaction. Thus, the sodium hydride may be employed in the reaction as a powder, or the sodium hydride may be employed as a coating on sodium chloride crystals, or the sodium hydride may be employed as a suspension in a non-reactive medium such as mineral oil, or other high boiling aliphatic hydrocarbon solvents.

In carrying out the process of the present invention, the only definite procedural requirement is that the reducible silicon compound which is to be reduced must be brought into contact with the sodium hydride at a temperature in the range described. This can be accomplished by a number of different methods. One very satisfactory method for accomplishing this result is to prepare a column packed with powdered sodium hydride. This column is then heated by any suitable means to the required temperature and the reducible silicon compound is passed through the packed column and reduced by substitution of the silicon-bonded chlorine atoms or alkoxy radicals by silicon-bonded hydrogen atoms. A slightly different procedure may also be employed in practicing the method of the present invention. This procedure comprises adding the sodium hydride to a suitable reaction vessel, and the reducible silicon compound is then added to the vessel in liquid or vapor form and allowed to react with the sodium hydride. Since the boiling points of many of the reducible silicon compounds which are employed in the present invention are below the reaction temperature, it is desirable to provide the reaction vessel with a reflux condenser so that unreacted material may be returned to the reaction vessel to react further with the sodium hydride.

A still different procedure may be employed in the practice of the present invention when the sodium hydride is used in the form of a suspension in an inert liquid. In this procedure, the sodium hydride suspension is agitated while the reducible silicon compound is introduced into the bottom of the suspension. The reducible silicon compound may be introduced either in the liquid or in the vapor form. When the compound is introduced in the vapor form, it is sometimes convenient to introduce the compound along with an inert gas such as nitrogen or hydrogen which acts as a carrier for the halide. In this modification the compound and the carrier gas are introduced into the stirred suspension of sodium hydride and reaction takes place as the reducible silicon compound and carrier gas rise through the liquid suspension.

Regardless of the particular procedure employed in practicing the invention of the subject application, the products are recovered from the reaction area by condensing the products in any suitable apparatus. Thus, where the products contain a large amount of volatile material, it is often convenient to collect the product in liquid nitrogen traps. Where the products are slightly less volatile, the collection traps may be traps cooled by a mixture of solid carbon dioxide in acetone. Of course, the products may also be collected as vapors in any suitable container.

In carrying out the process of the present invention the reaction temperature may vary from about 175–350° C. At temperatures below 175° C., the rate of reduction of the reducible silicon compound is extremely slow. Although the reaction may be carried out at temperatures higher than 350° C., decomposition of the reduction products sometimes occurs and therefore we prefer to limit the temperature to the range described. The preferred specific temperature range is from about 200–300° C. with the optimum temperature being about 250° C.

We have found that the reaction of the present invention proceeds satisfactorily at atmospheric pressure as well as subatmospheric pressures and superatmospheric pressures. For convenience and equipment simplification, we prefer, however, to conduct the reaction at or near atmospheric pressure.

Since the reaction of the present invention is a reaction between a solid and a liquid or a gas, depending on the particular conditions employed, one factor controlling the rate of reaction is the frequency of contact between the solid sodium hydride and the reducible silicon compound. Therefore, the reaction rate is improved by any means which will improve the contact between the reactants. Our preferred method of providing intimate contact between the reactants is to provide good agitation of the reaction mixture regardless of the type of reaction procedure employed. Thus, where the sodium hydride is employed in the form of a suspension in an inert liquid, we prefer to provide the reaction vessel with a suitable agitator for the suspension.

The proportions of the reactants employed in the practice of the present invention are not critical and may vary within wide limits. However, stoichiometric requirements call for reaction involving one mole of sodium hydride per atom of silicon-bonded halogen or alkoxy for complete reduction of the reducible silicon compound. A small or a large excess of either reactant may also be employed. In situations where the reaction is being carried out in a column or the like with unreacted reducible silicon compound being removed from the reaction area, we can employ recirculation of the unreacted material to increase the yield of silicon hydrides obtainable.

By the process of the present invention, we have found that it is possible to replace all or only a part of the silicon-bonded halogen atoms or alkoxy radicals on any reducible silicon compound. However, since our reaction provides a very effective method of replacing all of the silicon-bonded halogens or alkoxys with hydrogen, we generally conduct our reaction so that there is complete reduction. Although the method of the present invention is applicable to all types of compounds within the scope of Formula 1, we have found it particularly useful in the reduction of methyltrichlorosilane to methylsilane. This particular reaction is quite important since in the preparation of organosilicon compounds by the passage of methylchloride over silicon, the primary reaction products are dimethyldichlorosilane and methyltrichlorosilane. In the present state of the silicone chemistry art, the dimethyldichlorosilane is the most valuable product, since this product is the major constituent of silicone oils, gums, and resins. Because of this, there is sometimes an inconveniently large amount of methyltrichlorosilane left after conversion of the products of the organohalogenosilane synthesis to silicone products. In applications of organosilicon materials as water-proofing agents for fabrics, it has been found that the most desirable type of organosilicon compound is the compound containing silicon-bonded hydrogen atoms. Thus, by the process of the present invention we are able to convert the inconveniently large amount of methyltrichlorosilane into the desirable material methylsilane.

The following examples are illustrative of the practice of the present invention and are not intended for purpose of limitation.

*Example 1*

A stream of nitrogen (approximately 140 cc. per minute) was saturated with methyltrichlorosilane at 0° C. and passed through a glass tube 1 inch in diameter containing a 4-inch section of sodium hydride. The packed section of the glass tube was maintained at a temperature of about 300° C. The exit gases were passed through a liquid nitrogen trap which condensed all of the silicon-containing compounds. Analysis of the product showed it to consist of 3.6 mole percent of methylsilane, 3.1 mole percent of methyldichlorosilane, and 93.3 mole percent of unreacted methyltrichlorosilane.

*Example 2*

This example describes the reduction of methyltrichlorosilane by sodium hydride on sodium chloride. A total of 200 grams of sodium chloride (80 to 100 mesh, heated 3 hours at 150° C.) was added to a three-necked flask with a stirrer and heated to a temperature of about 280° C. under a nitrogen atmosphere. About 25 grams of sodium was added as small pieces to the hot bed of sodium chloride in three small portions. After each addition of sodium, 0.5 gram of carbon black (Monarch No. 7, Godfrey L. Cabot Co.) was added, followed by the passage of hydrogen over the bed. This hydrogen reacted with the sodium to form sodium hydride on the surface of the sodium chloride. After the conversion of the sodium to sodium hydride, 6.4 grams of methyltrichlorosilane was added to the reaction vessel dropwise. The methyltrichlorosilane, which vaporized when it came into contact with the hot sodium hydride, was condensed in a water-cooled reflux condneser and returned to the area of the sodium hydride. After the reaction was terminated and the reaction product as well as unreacted methyltrichlorosilane was collected in a liquid nitrogen trap. Upon distillation of the material in the liquid nitrogen trap, the resulting product consisted of a mixture of methylsilane, methylchlorosilane, and methyldichlorosilane. This mixture contained about 86 mole percent of methylsilane with the remainder being methylchlorosilane and methyldichlorosilane.

Example 3

In this example the sodium hydride was employed as a 21.9 percent by weight suspension of sodium hydride in mineral oil. This suspension was placed in a stirred reaction vessel which contained an inlet below the surface of the suspension. A mixture of methyltrichlorosilane and hydrogen was then passed into the bottom of this suspension to allow reaction to occur between the methyltrichlorosilane and sodium hydride. Prior to the admission of the methyltrichlorosilane into the sodium hydride suspension, the methyltrichlorosilane had been vaporized at a temperature of 150° C. The methyltrichlorosilane was fed to the reaction chamber at the rate of 0.8 cc. of liquid per minute and the hydrogen was employed at the rate of 200 cc. per minute. Analysis of the products passing from the mineral oil suspension showed the product to contain 50 mole percent of methylsilane, about 1 mole percent of methylchlorosilane, about 3 mole percent of methyldichlorosilane, and about 46 mole percent of unreacted methyltrichlorosilane. In this example the suspension of sodium hydride in mineral oil was maintained at a temperature of 250° C.

Example 4

In this example the same procedure used in Example 3 was followed except that the suspension of sodium hydride in mineral oil was maintained at a temperature of about 175° C. Examination of the products of this reaction revealed a trace of methylsilane with the majority of the material flowing from the reaction vessel being unreacted methyltrichlorosilane.

Example 5

In this example the procedure of Example 3 was again followed except that the temperature of the suspension of sodium hydride in mineral oil was maintained at 270° C. instead of 250° C. Analysis of the product passing from the reaction vessel indicated the presence of 54 mole percent of methylsilane, about 1 mole percent of methylchlorosilane, about 3 mole percent of methyldichlorosilane, and about 42 mole percent of unreacted methyltrichlorosilane.

Example 6

The procedure of this example was the same as that of Example 3 except that the sodium hydride was employed as a 21.3 percent by weight sodium hydride suspension in mineral oil and the reaction vessel contained 59 grams of this sodium hydride. Analysis of the products from the reaction vessel showed the presence of 66 mole percent of methylsilane, 1.5 mole percent of methylchlorosilane, 1.5 mole percent of methyldichlorosilane, and 31 mole percent of unreacted methyltrichlorosilane.

Example 7

In this example a reaction vessel equipped with a stirrer was filled with 73.0 grams of sodium hydride in sufficient mineral oil to provide a suspension containing 15 percent by weight of sodium hydride. Methyltrichlorosilane at the rate of 1 cc. of liquid per minute was vaporized at a temperature of 125° C. and the vapors were directed into the reaction vessel under the surface of the mineral oil. The mineral oil suspension was maintained at a temperature of 250° C. Analysis of the product flowing from the reaction vessel during the first hour of the reaction showed it to be almost pure methylsilane.

Example 8

In this example a mixture of 53 grams of sodium hydride in sufficient mineral oil to provide a suspension containing 14 percent by weight of sodium hydride was placed in a reaction vessel equipped with a stirrer and heated to a temperature of 250° C. Vinyltrichlorosilane was then vaporized at the rate of about 1 cc. of liquid per minute and delivered to the reaction vessel where reduction of the vinyltrichlorosilane took place. Analysis of the products from the reaction vessel showed the presence of vinyl silane, which was identified by its boiling point and infrared spectrum.

Example 9

In this example a mixture of 57 grams of sodium hydride in sufficient mineral oil to provide a suspension containing 15 percent by weight of sodium hydride was placed in a reaction vessel equipped with a stirrer and heated to a temperature of 250° C. Methyltriethoxysilane was then vaporized at the rate of about 1 cc. of liquid per minute and delivered to the reaction vessel where reduction of the methyltriethoxysilane took place. Analysis of the products from the reaction vessel showed the presence of methylsilane, which was identified by its boiling point and infrared spectrum.

Example 10

The procedure of Example 7 was followed employing trimethylchlorosilane and 52 grams of sodium hydride in 295 grams of mineral oil. The trimethylchlorosilane was supplied to the reaction vessel at the rate of about 1 cc. liquid per minute. Forty-three percent of the trimethylchlorosilane was converted to trimethylsilane, which was identified by its boiling point and infrared spectrum.

Example 11

About 42.3 grams of phenyltrichlorosilane and 120 grams of a 22.2 percent suspension of sodium hydride in mineral oil were loaded into a 300 ml. stainless steel rocking autoclave. The autoclave was purged with nitrogen, heated to 250° C., maintained at that temperature for five minutes and cooled to room temperature. The mixture was filtered and the filter cake was washed with pentane. The combined filtrates were distilled. The infrared spectrum of the material boiling at 87.5° to 104° at 50 mm. pressure showed strong absorption bands at 4.53 microns and 4.63 microns, indicating the presence of at least two different compounds containing SiH bonds.

Example 12

In this example 49 grams of sodium hydride as a 13.5 percent suspension in mineral oil was placed in a reaction vessel equipped with a stirrer and heated to a temperature of 250° C. Diethyldichlorosilane was vaporized at the rate of about 1 liquid cc. per minute and delivered to the reaction vessel where reduction of diethyldichlorosilane took place. In this manner 56 percent of the diethyldichlorosilane was converted to diethylsilane, identified by boiling point and infrared spectrum.

Although the above examples have indicated the reduction of only a few types of reducible silicon compounds, it should be understood that the process of the present invention is applicable to these compounds in general and in particular to all of those compounds within the scope of Formula 1. And although the examples have described the present reaction at temperatures of from only 175° C. up to 270° C., it should be understood that higher temperatures may be employed without departing from the scope of the present invention.

Furthermore, it should also be understood that the method of the present invention may be employed in the presence of both sodium and sodium hydride, although the presence of sodium does cause some formation of disilane compositions. In addition, although the sodium hydride has been described in only one liquid medium, it should be understood that the sodium hydride may be dispersed in any liquid medium which is inert under the conditions of the reaction and which has a boiling point sufficiently high so that the suspension medium is retained in the reaction system The various silicon hydrides prepared by the method of the present invention are useful in many applications. Thus, many of the hydrides which are prepared by the method of the present invention are useful as additives for high-powered fuels, particularly rocket fuels.

In addition, the silicon hydrides prepared by the method of the present invention may be hydrolyzed in an aqueous acidic solution to form siloxanes containing silicon-bonded hydrogen atoms. These siloxanes are useful in rendering fabrics waterproof.

What we claim as new and desire to secure by Letters Patent of the United States is:

1. The process which consists essentially of effecting reaction between (1) a silane having the formula $$Si(X)_a(R)_{4-a}$$

where X is a member selected from the class consisting of halogen and alkoxy, R is a member selected from the class consisting of hydrogen, alkyl, alkenyl, and aralkyl, and $a$ is an integer equal to from 1 to 4, inclusive, and (2) sodium hydride at a temperature of from 175 to 350° C.

2. The method of converting a silane containing at least one silicon-bonded chlorine atom with the remaining valences of silicon being satisfied by methyl to a corresponding silicon compound in which at least a portion of the silicon-bonded chlorine atoms are replaced by silicon-bonded hydrogen atoms which method consists essentially of contacting said former compound with sodium hydride at a temperature of from 175 to 350° C.

3. The method of converting methyltrichlorosilane to a mixture of methylsilane, methylchlorosilane and methyldichlorosilane which consists essentially of contacting said methyltrichlorosilane with sodium hydride at a temperature of from 175 to 350° C.

4. The method of reducing trimethylchlorosilane to trimethylsilane which consists essentially of contacting said trimethylchlorosilane with sodium hydride at a temperature of from 175 to 350° C.

5. The method of converting vinyltrichlorosilane to vinylsilane which consists essentially of contacting said vinyltrichlorosilane with sodium hydride at a temperature of from 175 to 350° C.

6. The method of converting diethyldichlorosilane to diethylsilane which consists essentially of contacting said diethyldichlorosilane with sodium hydride at a temperature of from 175 to 350° C.

7. The method of converting methyltrialkoxysilane to methylsilane which consists essentially of contacting said methyltrialkoxysilane with sodium hydride at a temperature of from 175 to 350° C.

8. A process which consists essentially of effecting reaction at a temperature of from 175° to 350° C. between (1) sodium hydride and (2) a silane having the formula $$(CH_3)_a SiX_{4-a}$$

wherein X is a halogen and $a$ is an integer from 1 to 3, inclusive.

9. A process which consists essentially of effecting reaction at a temperature of from 175° to 350° C. between (1) sodium hydride and (2) a silane having the formula $$R_a SiX_{4-a}$$

wherein R is a member of the group consisting of alkyl, aralkyl and alkoxy radicals, X is a halogen and $a$ is an integer from 1 to 3 inclusive.

10. The method of reducing a reducible silicon compound, which consists essentially of effecting reaction at a temperature of from 175°–350° C. between (1) sodium hydride, and (2) a silane having the formula $$Si(X)_a(R)_{4-a}$$

where X is a member selected from the class consisting of halogen and alkoxy, R is a member selected from the class consisting of hydrogen, alkyl, alkenyl, and aralkyl, and $a$ is an integer equal to from 1 to 4, inclusive, said sodium hydride being employed as a suspension in mineral oil.

11. The method of reducing a reducible silicon compound, which consists essentially of effecting reaction at a temperature of from 175°–350° C. between (1) sodium hydride and (2) a silane having the formula $$Si(X)_a(R)_{4-a}$$

where X is a member selected from the class consisting of halogen and alkoxy, R is a member selected from the class consisting of hydrogen, alkyl, alkenyl, and aralkyl, and $a$ is an integer equal to from 1 to 4, inclusive, said sodium hydride being employed as a coating on sodium chloride.

References Cited in the file of this patent

UNITED STATES PATENTS 2,576,311      Schlesinger et al. _____ Nov. 27, 1951

OTHER REFERENCES

Kipping et al.: "Jr. Chem. Soc." (London), volume 133 (1930), pages 1029–32.

Finholt et al.: "Am. Chem. Soc., Jr.," volume 69 (1947), pages 2692–2696, page 2695 only needed.

Mellor: "A Comprehensive Treatise of Inorganic and Theoretical Chemistry," volume 6 (1925), Longmans, Green & Company, Publishers (London), pages 967–968.

Hurd: "Am. Chem. Soc., Jr.," volume 67 (1945), pages 1545–1548.